United States Patent [19]
Okuda et al.

[11] Patent Number: 5,529,547
[45] Date of Patent: Jun. 25, 1996

[54] DIFFERENTIAL

[75] Inventors: Hirofumi Okuda; Shiro Ichiki; Hideyuki Sato, all of Saitama-ken, Japan

[73] Assignee: Zexel Corporation, Tokyo, Japan

[21] Appl. No.: 493,967

[22] Filed: Jun. 23, 1995

[30] Foreign Application Priority Data

Jul. 18, 1994 [JP] Japan .................................. 6-187720

[51] Int. Cl.⁶ ....................................................... F16H 1/38
[52] U.S. Cl. ........................................... 475/249; 475/252
[58] Field of Search .................................... 475/248, 249, 475/252

[56] References Cited

U.S. PATENT DOCUMENTS

| 5,127,889 | 7/1992 | Suzuki | 475/227 |
| 5,362,284 | 11/1994 | Brewer | 475/249 |

FOREIGN PATENT DOCUMENTS

0130806A2 1/1985 European Pat. Off. .
2-66341 3/1990 Japan .
2-142947 6/1990 Japan .

*Primary Examiner*—Dirk Wright

[57] ABSTRACT

In a differential for vehicles, a pair of side gears are received in a housing and coaxial with the housing. The pair of side gears are spline-connected with end portions of a pair of coaxial output shafts. The pair of side gears are meshed with each other through paired element gears. Each side gear has a protrusion of a reduced diameter to be inserted in a receiving recess of the housing. A primary thrust washer and a coned disk spring are interposed between a shoulder of each side gear and the housing. A secondary thrust washer is interposed between the protrusion of the side gear and the housing. With a distal end face of the protrusion of the side gear contacting the housing through the secondary thrust washer, a distance between the shoulder of the side gear and the inner surface of the housing is larger than a total thickness of the primary thrust washer and the coned disk spring.

5 Claims, 5 Drawing Sheets

DIFFERENTIAL

BACKGROUND OF THE INVENTION

This invention relates to a differential suited to be used for vehicles, etc.

The differential for vehicles includes a housing rotationally driven by an engine, a pair of side gears rotatably received in and coaxial with the housing and three pairs, for example, of element gears rotatably supported within the housing and meshed with the pair of side gears, respectively. The paired element gears are in mesh with each other. Thrust washers are disposed between end faces of the pair of side gears and between end faces of the pair of side gears and the housing. The pair of side gears are connected to end portions of a pair of coaxial output shafts, respectively.

In the differential thus constructed, if, for example, a vehicle wheel connected to one output shaft should go off a road, the output shaft would be idled (high-speed rotation) and no torque could be transmitted to the other vehicle wheel. As a consequence, there is the problem in that the off-road state cannot be removed.

In order to solve the above problem, in a differential which is disclosed in Japanese Laid-Open Patent Application Nos. Hei 2-66341 and Hei 2-142947, a pair of coned disk springs are interposed between a pair of side rears and a housing, respectively and the side gears are axially biased by the coned disk springs so that a so-called "preload" is acted on the side gears. Since a frictional resistance is generated between the side gears and the thrust washers by this preload, a torque can be transmitted to one output shaft even if the other output shaft is idled at a high speed.

Incidentally, since each side gear is spline-connected to a corresponding output shaft, when a torque is transmitted to the side gear through a meshing-engagement with the element gear, an axial vector of the torque is acted on the side gear as a thrust force. In the case where this thrust force acts outwardly, the side gear is moved toward the housing and pushes the coned disk spring through the thrust washer. When this coned disk spring is caused to take a flat plate-like configuration, the side gear is prohibited to move any further in the axial direction. Thereafter, when the thrust force is removed, the side gear is returned to its original position by the force of the coned disk spring. At that time, there is a possibility that the attitude of the coned disk spring is occasionally changed. For example, the attitude of the coned disk spring is changed from a state in which an outer peripheral edge of the coned disk spring is situated on the housing side with its inner peripheral edge being in contact with an end face of each side gear through the thrust washer to a state in which an inner peripheral edge, in turn, is situated on the housing side with its outer peripheral edge being in contact with the end face of each side gear through the thrust washer.

Before the attitude of the coned disk spring is changed, the inner peripheral portion of the thrust washer contacts the end face of the side gear harder than the outer peripheral portion does. Consequently, after the attitude of the coned disk spring is changed, the outer peripheral portion of the thrust washer contacts the end face of the side gear harder than the inner peripheral portion does. Therefore, the change of the attitude of the coned disk spring brings about a change of friction between the thrust washer and the side gear and eventually brings out a change of a distribution ratio of the torque.

As additional prior art to be listed here, there are EPC Patent No. 0130806 and U.S. Pat. No. 5,127,889. The EPC Patent No. 0130806 discloses a differential in which a coned disk spring is disposed between a pair of side gears. The U.S. Pat. No. 5,127,889 discloses a differential in which thrust washers are interposed between opposite ends of each element gear and a housing.

SUMMARY OF THE INVENTION

It is an object of the present invention to provide a differential which is capable of preventing the change of an attitude of a coned disk spring exerting a preload and also preventing the change of a distribution ratio of the torque caused by this change of attitude.

According to the present invention, a pair of secondary thrust washers are each interposed between a distal end face of the protrusion of the corresponding side gear and a bottom surface of the receiving recess. The front end face of the protrusion of each of the side gears is in contact with the bottom surface of the corresponding receiving recess through the secondary thrust washer, thereby prohibiting the side gear from moving any further. In the foregoing state of the side gear, a distance between the shoulder of the side gear and the inner surface of the housing is larger than a total thickness of the primary thrust washer and the coned disk spring.

Each thrust washer may have a protrusion projecting toward the inner surface of the housing. The protrusion is disposed on at least one of an inner side and an outer side of the coned disk spring in a sense of a radial direction. A projecting amount of the protrusion is larger than a thickness of the coned disk spring.

One of the side gears may have a protrusion of a reduced diameter formed on the end face thereof and inserted in the coned disk spring. The protrusion contacts the other side gear through the thrust washer. A projecting amount of the protrusion is larger than a thickness of the coned disk spring.

One of the thrust washers may have a protrusion formed thereon. The protrusion is disposed on at least one of an inner side and an outer side of the coned disk spring in a sense of a radial direction and contacting the other thrust washer. A projecting amount of the protrusion is larger than a thickness of the coned disk spring.

Each thrust washer may have a protrusion formed thereon and projecting toward the inner surface of the housing. The protrusion is disposed on at least one of an inner side and an outer side of the coned disk spring and contacting the inner side of the housing. A projecting amount of the protrusion is larger than a thickness of the coned disk spring.

DETAILED DESCRIPTION OF THE EMBODIMENTS

One embodiment of the present invention will now be described with reference to FIGS. 1 to 5.

Figure 1:
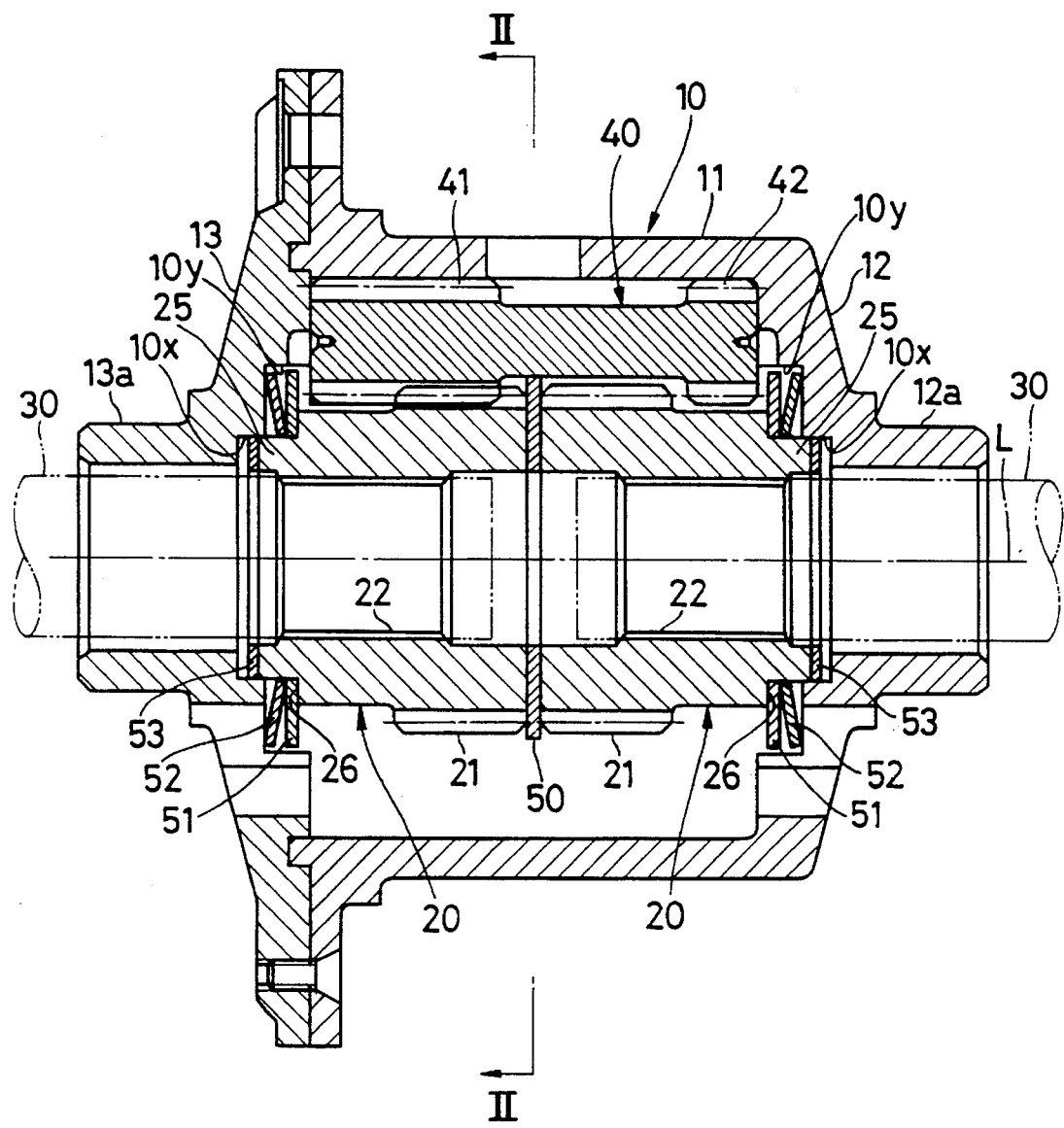
FIG. 1 is a vertical sectional view of a differential for vehicles, according to one embodiment of the present invention.
Figure 2:
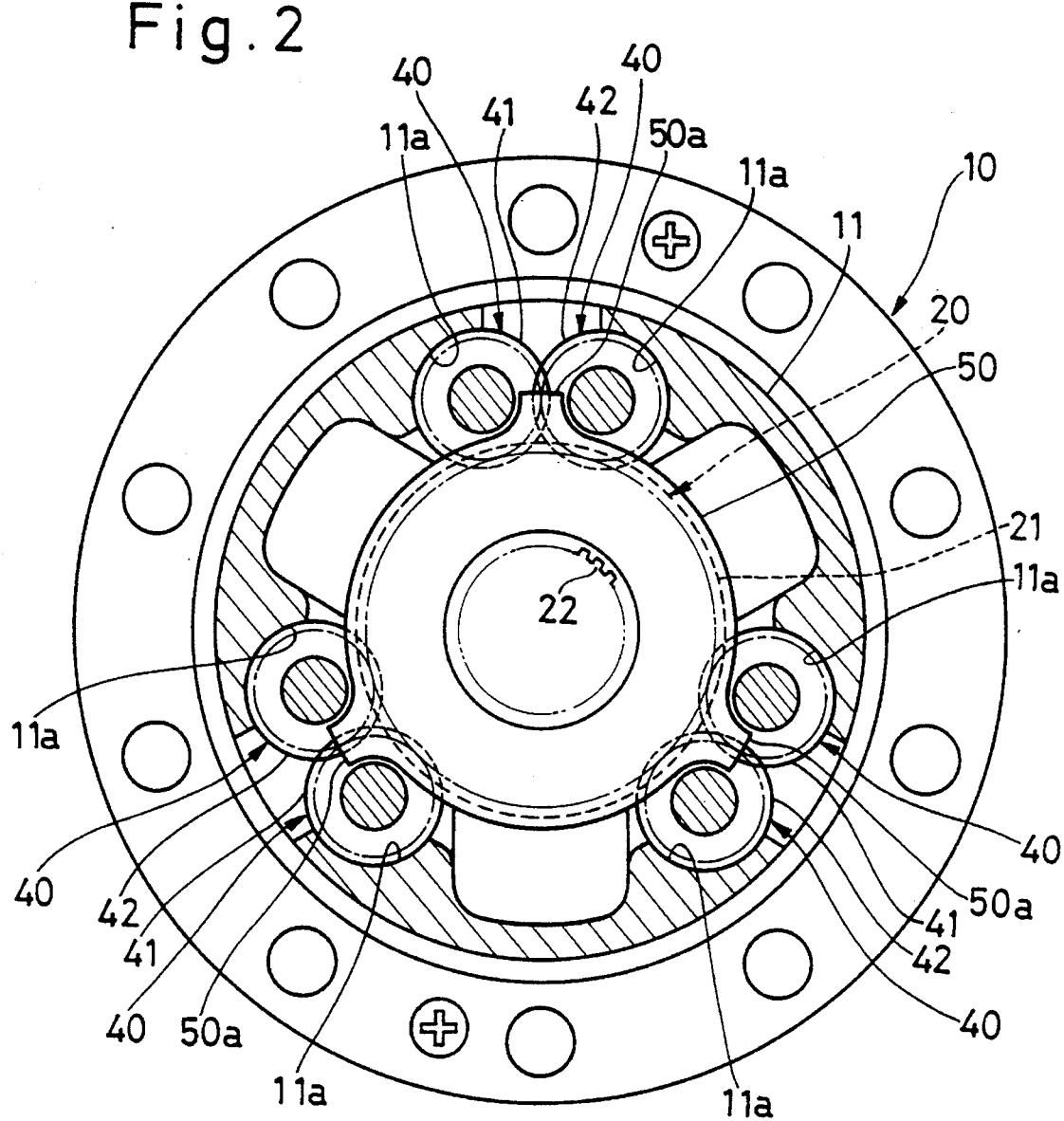
FIG. 2 is a sectional view taken on line II—II of FIG. 1.
Figure 3:
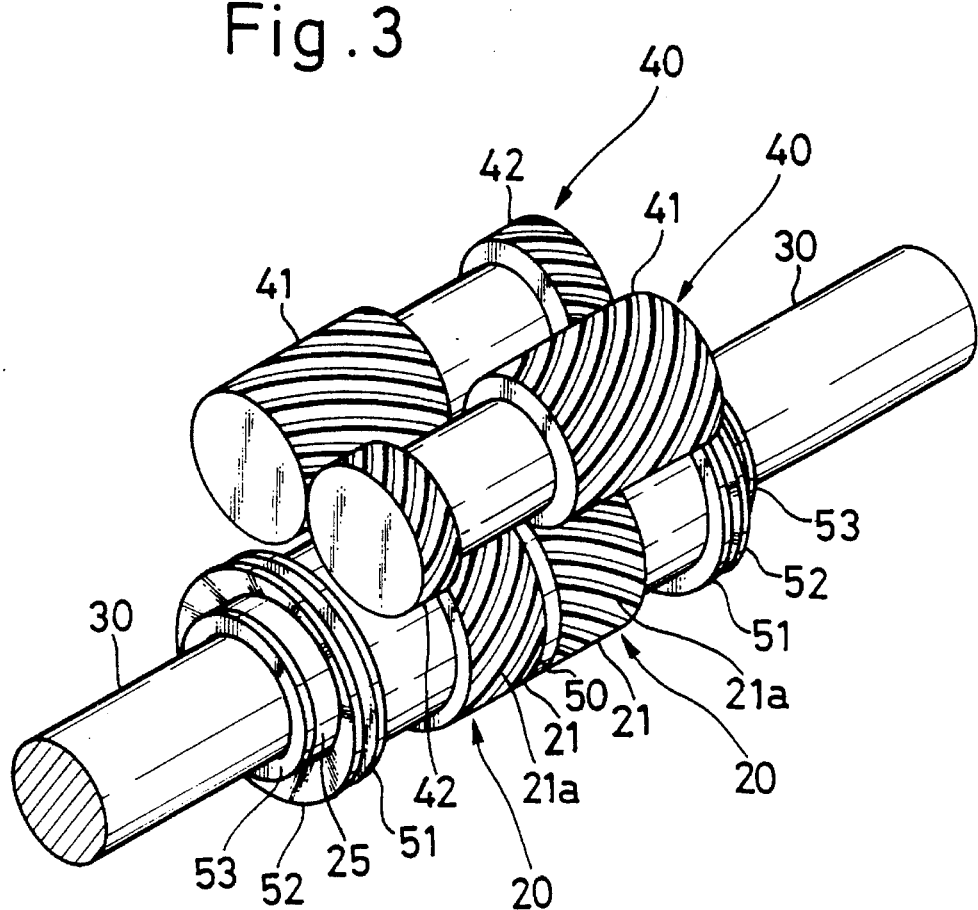
FIG. 3 is a perspective view of a part of the differential. In this illustration, a housing is omitted and only one pair of element gears are shown.

As shown in FIGS. 1 to 3, a parallel-axis differential for vehicles comprises a housing 10. This housing 10 includes a sleeve portion 11, an end wall 12 integral with one end of the sleeve portion 11, and a closure 13 for closing an opening in the other end of the sleeve portion 11. The end wall 12 and closure 13 of the housing 10 are formed with journal portions 12a and 13a, respectively. The housing 10 is rotatably supported about an axis L through the journal portions 12a and 13a carried on bearings. A ring gear (not shown) is secured to the closure 13 of the housing 10. The housing 10 receives a driving torque from an engine and rotationally driven through the ring gear and a gear which is in engagement with the ring gear.

A pair of cylindrical side gears 20 are rotatably received in and coaxial with the housing 10. Each side gear 20 has a tooth portion 21 which is formed with helical teeth 21a (see FIG. 3). A pair of axles 30 (output shafts) extend through the journal portions 12a and 13a, with end portions thereof spline-connected to spline portions 22 of the side gears 20, respectively. Owing to this arrangement, the side gears 20 can be axially moved with respect to the output shafts 30, respectively.

As typically shown in FIG. 2, three pairs of support surfaces 11a are formed in an inner peripheral surface of the sleeve portion 11 of the housing 10 at equal spaces in the circumferential direction. Each support surface 11a constitutes a part of a cylindrical surface. Paired element gears 40 are rotatably supported by the paired support surfaces 40, respectively. Axes of rotation of the element gears 40 are in parallel relation to the axis L. Each element gear 40 has a long tooth portion 41 and a short tooth portion 42 at opposite end portions thereof. As best shown in FIG. 3, the long tooth portion 41 of one of the paired element gears 40 is in engagement with the tooth portion 21 of the left side gear 20, and also with the short tooth portion 42 of the other element gear 40. Similarly, the long tooth portion 41 of the other element gear 40 is in engagement with the tooth portion 21 of the right side gear 20 and also with the short tooth portion 42 of the first-mentioned element gear 40.

A thrust washer 50 is interposed between opposing end faces of the pair of side gears 20. As shown in FIG. 2, this thrust washer 50 has three projections 50a formed on an outer peripheral edge thereof and extending radially outwardly therefrom. Each projection 50a is allowed to be inserted between the paired element gears 40. Owing to this arrangement, rotation of the thrust washers 50 with respect to the housing 10 is prohibited and movement thereof only in the axial direction is allowed. As a consequence, opposite surfaces of the thrust washer 50 are served as frictional slide surfaces with respect to the side gears 20.

The end wall 12 and the closure 13 have annular receiving recesses 10y formed in inner surfaces thereof, respectively. An annular receiving recess 10x of a reduced diameter is formed in a bottom surface of each receiving recess 10y.

Each side gear 20 has a protrusion 25 of a reduced diameter axially extending outwardly, namely, toward the end wall 12 and the closure 13. The protrusions 25 are received respectively in the receiving recesses 10x of the end wall 12 and closure 13. Each side gear 20 has an annular shoulder 26 formed on a boundary area between the protrusion 25 and the other part of the side gear 20. The shoulders 26 are faced with the bottom surfaces of the receiving recesses 10y, respectively.

An annular thrust washer 51 and a coned disk spring 52 are arranged in this order on an outer periphery of the protrusion 25 of each side gear 20 toward outwardly in the axial direction. The thrust washers 51 and coned disk springs 52 are interposed respectively between the shoulders 26 of the side gears 20 and the bottom surfaces of the receiving recesses 10y. The pair of coned disk springs 52 bias the pair of side gears 20 toward each other through the thrust washers 51, respectively.

That surface of each thrust washer 51 facing the corresponding side gear 20 is served as a frictional slide surface. That is, since a frictional resistance is great between each thrust washer 51 and each coned disk spring 52, the thrust washer 51 is rotated together with the coned disk spring 52 and housing 10 and rotated relative to the shoulder 26 of each side gear 20.

Also, a thrust washer 53 is disposed between a distal end face of the protrusion of each side gear 20 and a bottom surface of each receiving recess 10x. For example, that surface of this thrust washer 53 facing the shoulder 26 of the side gear 20 is smoother than the other surface facing the end wall 12 or the closure 13, and served as a frictional slide surface. Owing to this arrangement, as shown in FIG. 5, when the protrusion 25 of the side gear 20 is brought into contact with the bottom surface of the receiving recess 10x through the thrust washer 53, the thrust washer 53 is rotated together with the housing 10 and rotated relative to the side gear 20.

Figure 5:
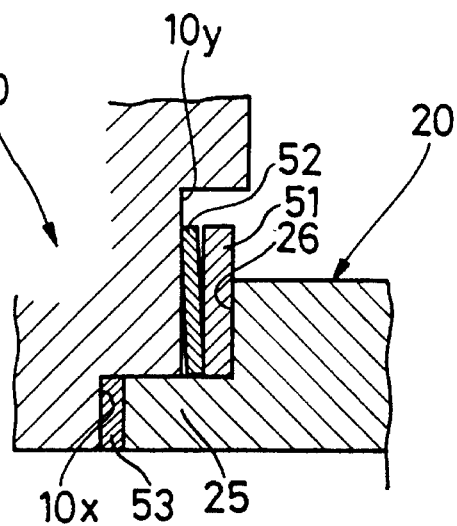
FIG. 5 is an enlarged sectional view showing the attitude change preventive construction. In the illustrated state, a thrust force caused by an axial vector of the torque is acting on the side gear.

What is an important thing here is that, as shown in FIG. 5, with the protrusion 25 of the side gear 20 being in contact with the bottom surface of the receiving recess 10x through the thrust washer 53, a distance between the shoulder 26 of the side gear 20 and the bottom surface of the receiving recess 10y is larger than the total of a thickness $T_1$ of the thrust washer 51 and a thickness $T_2$ of the coned disk spring 52. In other words, in the state of FIG. 5, the distance between the thrust washer 51 and the bottom surface of the receiving recess 10y is larger than the thickness $T_2$ of the coned disk spring 52.

Figure 4:
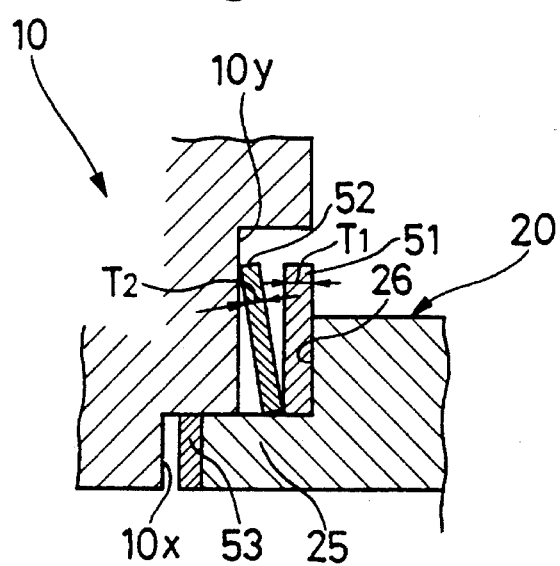
FIG. 4 is an enlarged sectional view showing a construction for preventing a possible change of the attitude of a cone disk spring applicable to the differential. In the illustrated state, a thrust force caused by an axial vector of the torque is not acting on the side gear.

In the differential thus constructed, when one of the vehicle wheels go off a road (when a friction between the wheel and the road is zero), the output shaft 30 connected to this wheel is idled at a high speed. At that time, no torque transmission caused by engagement between the side gear 20 and the element gear 40 is acted on the side gear 20. As a consequence, no thrust force caused by an axial vector of the torque is generated. However, as shown in FIGS. 1 and 4, under the effect of the preloads of the pair of coned disk springs 52, since the pair of thrust washers 51 are biased toward the pair of side gears 20 and the pair of side gears 20 are, in turn, biased toward the thrust washers 50, frictions are generated between the side gears 20 and the thrust washers 50, 51. For this reason, a torque is distributed to the other output shaft 30.

When the vehicle runs straight ahead, the housing 10, the element gears 40, and the side gears 20 are rotated in unison. The driving torque transmitted from the ring gears to the housing 10 is equally distributed to the pair of axles 30 through the three pairs of element gears 40 and the one pair of side gears 20.

When the vehicle is making a turn, the element gears 40 are rotated relative to the housing 10 and one of the side gears 20 is rotated at a higher speed than the other. As a consequence, a differential is generated. Even during the time the differential is generated, since thrust force acts on the side gears 20 through the meshing engagement between the element gears 40 and the side gears 20 and friction is generated between the side gears 20 and the thrust washers 50, 51, a torque is transmitted from the output shaft 30 which is rotating at a high speed to the other output shaft 30 which is rotating at a low speed.

When the vehicle is running straight ahead or making a turn, the side gears 20 are sometimes moved toward the coned disk springs 53 by an external thrust force applied thereto. In that case, as shown in FIG. 5, the distal end face of the protrusion 25 of the side gear 20 contacts the bottom surface of the receiving recess 10x through the thrust washer 53, thereby prohibiting the side gear 20 from moving axially any further. In that state, a friction between the thrust washer 53 and the distal end face of the protrusion 25 of the side gear 20 is additionally contributed to the torque distribution. In the foregoing state, since the distance between the shoulder 26 of the side gear 20 and the bottom surface of the receiving recess 10y is larger than the total thickness $T_1+T_2$ of the thrust washer 51 and coned disk spring 52, the coned disk spring 52 is not caused to have a flat shape. Instead, the spring 52 keeps its conical shape. With this features, the attitude of the coned disk spring 52 is not changed. More specifically, the coned disk spring 52 can be prevented from changing its attitude from a first state in which an outer peripheral edge of the coned disk spring 52 contacts the bottom surface of the receiving recess 10y and an inner peripheral edge contacts the thrust washer 51 to a second state in which the inner peripheral edge contacts the bottom surface of the receiving recess 10y and the outer peripheral edge contacts the thrust washer 51. As a consequence, a possible change of the torque distribution ratio caused by the change of attitude can be prevented.

Other embodiments of the present invention will now be described. In those embodiments, component parts corresponding to those of the preceding embodiment are denoted by identical reference numeral and description thereof is omitted.

Figure 6:
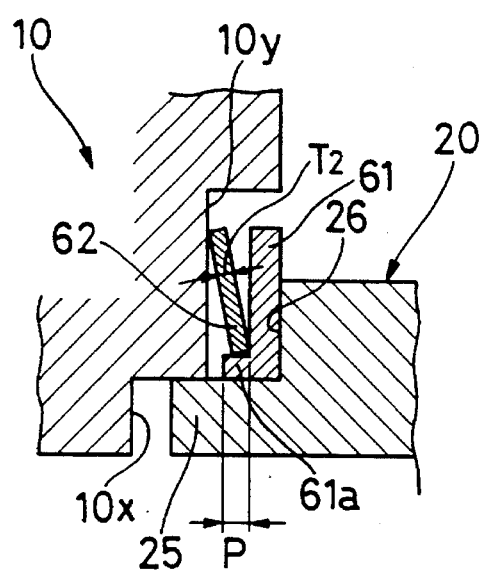
FIG. 6 is an enlarged sectional view, similar to FIG. 4, of an attitude change preventive construction according to a modified embodiment of the present invention.
Figure 7:
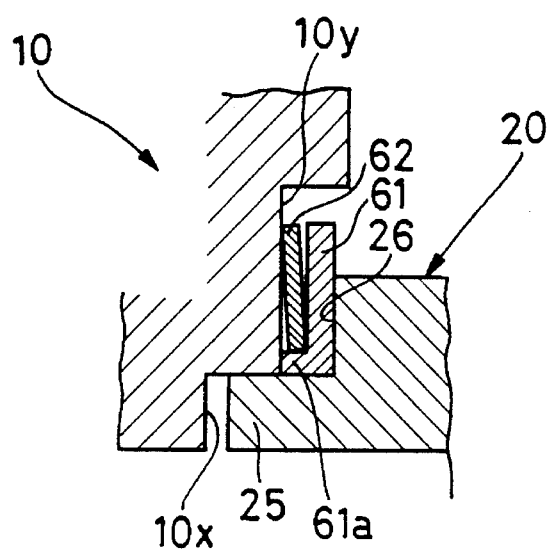
FIG. 7 is an enlarged sectional view, similar to FIG. 5, of the attitude change preventive construction.

In an embodiment shown in FIGS. 6 and 7, no thrust washer is interposed between the protrusion 25 of the side gear 20 and the bottom surface of the receiving recess 10x, and the protrusion 25 does not contact the bottom surface of the receiving recess 10x. In this embodiment, a protrusion 61a is formed, by pressing, on an inner peripheral edge of a thrust washer 61 interposed between the shoulder 26 of the side gear 20 and the bottom surface of the receiving recess 10y. The protrusion 61a is allowed to project axially toward the bottom surface of the receiving recess 10y. In this embodiment, the protrusion 61a is formed in an annular pattern on the thrust washer 61 over an entire periphery thereof. In the alternative, a plurality of protrusions may be formed circumferentially on the thrust washer 61 at appropriate spaces.

An inner peripheral edge of a coned disk spring 62 is disposed on an outer periphery of the protrusion 61a. It should be underlined here that a projecting amount P of the protrusion 61 is larger than the thickness $T_2$ of the coned disk spring 62. For this reason, when the side gear 20 is moved axially outwardly and the protrusion 61a of the thrust washer 61 contacts the bottom surface of the receiving recess 10y, the distance between the thrust washer 61 and the bottom surface of the receiving recess 10y can be maintained larger than the thickness $T_2$ of the coned disk spring 62 (see FIG. 7). As a consequence, the coned disk spring 62 can be prevented from taking a flat shape and eventually, a possible change of the attitude of the coned disk spring 62 can be prevented.

In this embodiment, that surface of the side gear 20 of the thrust washer 61 facing the shoulder 26 is served as a frictional slide surface, and the thrust washer 61 is rotated together with the coned disk spring 62 and the housing 10. Owing to this arrangement, when the protrusion 61a contacts the bottom surface of the receiving recess 10y, the area of the frictional slide surface is not increased. Therefore, the torque distribution ratio can be prevented from being discontinuously changed at or around the time the protrusion 61a contacts the housing 10.

Figure 8:
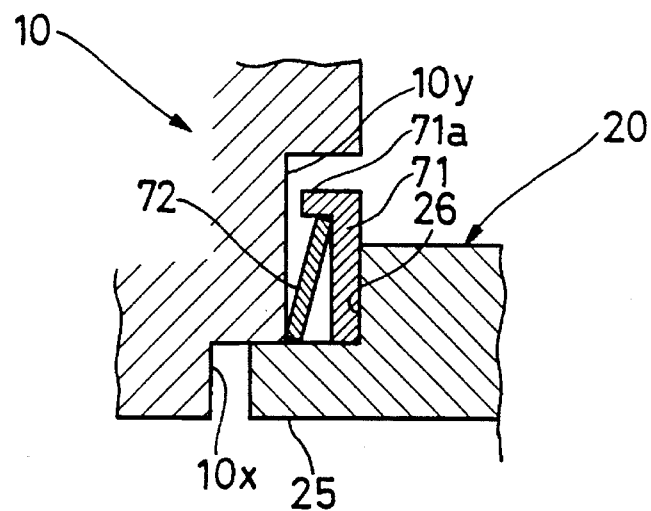
FIG. 8 is an enlarged sectional view, similar to FIG. 4, of an attitude change preventive construction according to another modified embodiment of the present invention.

In an embodiment shown in FIG. 8, a protrusion 71a is formed on an outer peripheral edge of a thrust washer 71. This protrusion 71a is allowed to project toward the bottom surface of the receiving recess 10y. The protrusion 71a is disposed radially outwardly of a coned disk spring 72. A projecting amount of the protrusion 71a is larger than the thickness of the coned disk spring 72.

Figure 9:
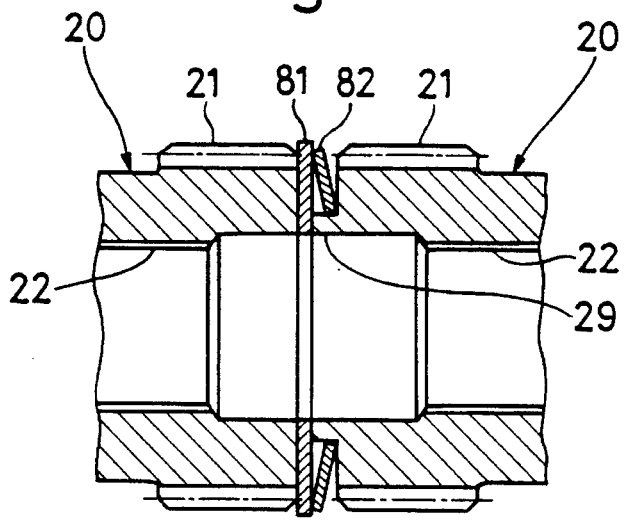
FIG. 9 is a sectional view of an attitude change preventive construction to be interposed between a pair of side gears.

In an embodiment shown in FIG. 9, a thrust washer 81 and a coned disk spring 82 are arranged between the pair of side gears 20. The pair of side gears 20 are preloaded in a direction away from each other by the coned disk spring 82. The thrust washer 81 is rotatably supported by the housing 10. The protrusion 29 of a reduced diameter is formed on the end face of one of the side gears 20. This protrusion 29 is allowed to project toward the other side gear 20. An inner peripheral edge of the coned disk spring 82 is disposed on the outer periphery of the protrusion 29. An outer peripheral edge of the coned disk spring 82 is in contact with the thrust washer 81. In this embodiment, the projecting amount of the protrusion 29 is larger than the thickness of the coned disk spring 82. A possible change of the attitude of the coned disk spring 82 can be prevented by the protrusion 29 being in contact with the thrust washer 81. In this embodiment, the thrust washer 81 is rotated together with the coned disk spring 82 and the side gear 20 on the right-hand side and a left-hand side surface of the thrust washer 81 is served as a frictional slide surface.

Figure 10:
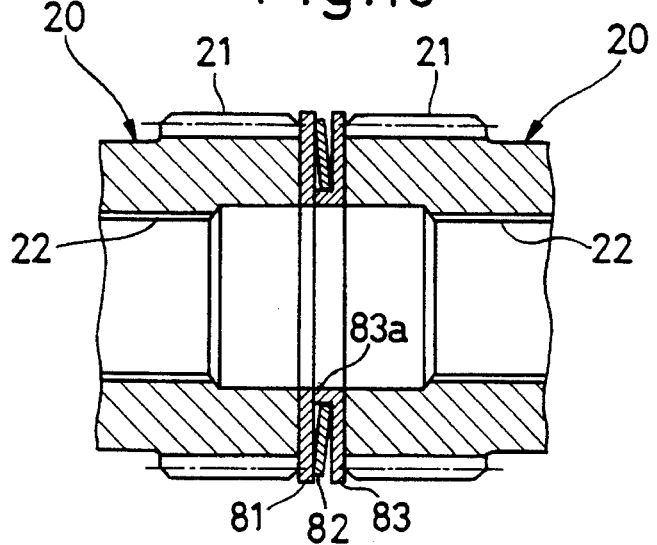
FIG. 10 is a sectional view of an attitude change preventive construction to be interposed between a pair of side gears, according to a modified embodiment of the present invention.

In an embodiment shown in FIG. 10, another thrust washer 83 in addition to the above-mentioned thrust washer 81 and coned disk spring 82, is interposed between the pair of side gears 20. This thrust washer 83 is rotatably supported by the housing 10 as in the case with the thrust washer 81.

The coned disk spring 82 is disposed between the thrust washers 81 and 83. A protrusion 83a is formed on an inner peripheral edge of the thrust washer 83. A projecting amount of the protrusion 83a is larger than the thickness of the coned disk spring 82. In this embodiment, a possible change of the attitude of the coned disk spring 82 can be prevented by the protrusion 83a of the thrust washer 83 being in contact with the thrust washer 81. In this embodiment, a selected one of the left surface of the thrust washer 81 and the right surface of the thrust washer 83 is served as a frictional slide surface. It may be designed such that the protrusion 83a is formed on an outer peripheral edge of the thrust washer 83 and disposed radially outwardly of the coned disk spring 82.

Figure 11:
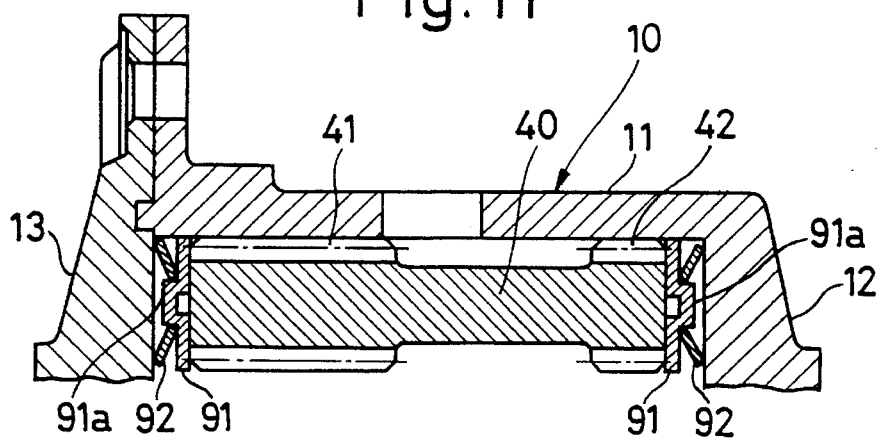
FIG. 11 is a sectional view of an attitude change preventive construction disposed at opposite ends of an element gear.

In an embodiment shown in FIG. 11, thrust washers 91 and coned disk springs 92 are disposed between opposite end faces of each element gear 40 and the inner surfaces (an inner surface of the end wall 12 and the inner surface of the closure 13) of the housing 10, respectively. A protrusion 91a is formed, by pressing, on a central portion of each thrust washer 91. This protrusion 91a is allowed to project axially toward an inner surface of the housing 10. Inner peripheral edges of the coned disk springs 92 are in contact with the thrust washers 91 and arranged on outer peripheries of the protrusions 91a, respectively, whereas outer peripheral edges thereof are in contact with the inner surfaces of the housing 10, respectively. In this embodiment, that surface of each thrust washer 91 facing the element gear 10 is served as a frictional slide surface. A projecting amount of each protrusion 91a is larger than the thickness of each coned disk spring 92. In this embodiment, a torque is distributed by friction between the element gear 10 and the thrust washers 91. When the element gear 10 is axially moved, the protrusion 91a contacts the inner surface of the housing 10. As a consequence, a possible change of the attitude of each coned disk spring 92 can be prevented.

The present invention is not limited to the above embodiments and many changes can be made in accordance with necessity.

For example, in the above embodiments, although three pairs of element gears are employed, at least one pair of element gears are good enough. The present invention is likewise applicable to a differential in which axes of the element gears and the side gears are skewed.

In the embodiments shown in FIGS. 10 and 11, a protrusion may be formed on the outer periphery of each thrust washer.

What is claimed is:

1. A differential for vehicles comprising:

(a) a housing rotatable about a rotational axis upon receipt of a rotational torque;

(b) a pair of cylindrical side gears rotatably received in said housing and coaxial with said housing, said pair of side gears being spline-connected at inner peripheries thereof to end portions of a pair of coaxial output shafts, respectively, said pair of side gears having helical teeth portions formed on outer peripheries thereof, each of said side gear having a protrusion of a reduced diameter formed on an outer end thereof and an annular shoulder formed on a boundary area between said protrusion and the other part of said side gear, said protrusion being received in a receiving recess formed in an inner surface of said housing;

(c) at least a pair of element gears rotatably supported in said housing and engaged respectively with said pair of side gears, said paired element gears being engaged with each other;

(d) a pair of primary thrust washers each disposed on an outer periphery of said protrusion of said corresponding side gear and interposed between said shoulder of said corresponding side gear and the inner surface of said housing;

(e) a pair of coned disk springs each disposed on an outer periphery of said protrusion of said corresponding side gear and interposed between said shoulder of said corresponding side gear and the inner surface of said housing; and (f) a pair of secondary thrust washers each interposed between a distal end face of said protrusion of said corresponding side gear and a bottom surface of said receiving recess, said front end face of said protrusion of each of said side gears being in contact with said bottom surface of said corresponding receiving recess through said secondary thrust washer, thereby prohibiting said side gear from moving any further, in the foregoing state of said side gear, a distance between said shoulder of said side gear and the inner surface of said housing being larger than a total thickness of said primary thrust washer and said coned disk spring.

2. A differential for vehicles, comprising:

(a) a housing rotatable about a rotational axis upon receipt of a rotational torque;

(b) a pair of cylindrical side gears rotatably received in said housing and coaxial with said housing, said pair of side gears being spline-connected at inner peripheries thereof to end portions of a pair of coaxial output shafts, respectively, said pair of side gears having helical teeth portions formed on outer peripheries thereof;

(c) at least a pair of element gears rotatably supported in said housing and engaged respectively with said pair of side gears, said paired element gears being engaged with each other;

(d) a pair of thrust washers disposed between end faces of said pair of side gears and the inner surface of said housing respectively;

(e) a pair of coned disk springs each disposed between the end face of said corresponding side gear and said thrust washer; and (f) said thrust washers each having a protrusion projecting toward the inner surface of said housing, said protrusion being disposed on at least one of an inner side and an outer side of said coned disk spring in a sense of a radial direction, a projecting amount of said protrusion being larger than a thickness of said coned disk spring.

3. A differential for vehicles, comprising:

(a) a housing rotatable about a rotational axis upon receipt of a rotational torque;

(b) a pair of cylindrical side gears rotatably received in said housing and coaxial with said housing, said pair of side gears being spline-connected at inner peripheries thereof to end portions of a pair of coaxial output shafts, respectively, said pair of side gears having helical teeth portions formed on outer peripheries thereof;

(c) at least a pair of element gears rotatably supported in said housing and engaged respectively with said pair of side gears, said paired element gears being engaged with each other;

(d) a thrust washer disposed between opposing end faces of said pair of side gears;

(e) a coned disk spring disposed between said thrust washer and the end face of one of said side gears; and (f) one of said side gears having a protrusion of a reduced diameter formed on the end face thereof and inserted in said coned disk spring, said protrusion contacting the other side gear through said thrust washer, a projecting amount of said protrusion being larger than a thickness of said coned disk spring.

4. A differential for vehicles, comprising:

(a) a housing rotatable about a rotational axis upon receipt of a rotational torque;

(b) a pair of cylindrical side gears rotatably received in said housing and coaxial with said housing, said pair of side gears being spline-connected at inner peripheries thereof to end portions of a pair of coaxial output shafts, respectively, said pair of side gears having helical teeth portions formed on outer peripheries thereof;

(c) at least a pair of element gears rotatably supported in said housing and engaged respectively with said pair of side gears, said paired element gears being engaged with each other;

(d) a pair of thrust washers disposed between opposing end faces of said pair of side gears;

(e) a coned disk spring disposed between said pair of thrust washers; and (f) one of said thrust washers having a protrusion formed thereon, said protrusion being disposed on at least one of an inner side and an outer side of said coned disk spring in a sense of a radial direction and contacting the other thrust washer, a projecting amount of said protrusion being larger than a thickness of said coned disk spring.

5. A differential for vehicles, comprising:

(a) a housing rotatable about a rotational axis upon receipt of a rotational torque;

(b) a pair of cylindrical side gears rotatably received in said housing and coaxial with said housing, said pair of side gears being spline-connected at inner peripheries thereof to end portions of a pair of coaxial output shafts, respectively, said pair of side gears having helical teeth portions formed on outer peripheries thereof;

(c) at least a pair of element gears rotatably supported in said housing and engaged respectively with said pair of side gears, said paired element gears being engaged with each other;

(d) a pair of thrust washers each disposed between corresponding one of opposite end faces of said element gears and the inner surface of said housing;

(e) a pair of thrust washers each disposed between said corresponding thrust washer and the inner surface of said housing; and (f) said thrust washers each having a protrusion formed thereon and projecting toward the inner surface of said housing, said protrusion being disposed on at least one of an inner side and an outer side of said coned disk spring and contacting the inner side of said housing, a projecting amount of said protrusion being larger than a thickness of said coned disk spring.

* * * * *